United States Patent [19]
Lee et al.

[11] Patent Number: 5,991,222
[45] Date of Patent: Nov. 23, 1999

[54] METHOD FOR WRITING AND SEARCHING ON A TAPE FOR A DIGITAL SIGNAL WRITING AND REPRODUCING DEVICE

[75] Inventors: Sang-Mun Lee, Seoul; Doo-Hee Lee, Kyungki-do, both of Rep. of Korea

[73] Assignee: LG Electronics, Inc., Seoul, Rep. of Korea

[21] Appl. No.: 09/001,004

[22] Filed: Dec. 30, 1997

[30] Foreign Application Priority Data

Dec. 31, 1996 [KR] Rep. of Korea ...................... 96-79277

[51] Int. Cl.$^6$ ................................... G11C 13/00
[52] U.S. Cl. ................... 365/230.01; 365/230.03
[58] Field of Search ............................ 365/244, 230.01, 365/230.03, 230.05, 230.08; 369/32, 47

[56] References Cited

U.S. PATENT DOCUMENTS 5,546,368   8/1996   Lee et al. ................................... 369/32

Primary Examiner—Terrell W. Fears

[57] ABSTRACT

A method of writing and searching index data for a DVCR is disclosed. The method of writing index data for a DVCR includes the steps of writing a program number and performing a program writing at a position of a program start mark of a current program if a program writing command is input in the course of viewing a program, determining whether or not there is a program start mark of a program erased in the course of performing the program writing, writing a program end mark and index data if there is the program start mark of the erased program, and writing a program start mark of a next program. The method of searching index data for a DVCR includes the steps of displaying index data if an index reproduction key is input, searching and reproducing a program selected by a user among the displayed index data, and ejecting a tape after writing a new index data by moving the tape to a program end mark of a current program if an ejection key is input. The method of writing and searching index data for a DVCR has an advantage that it is easy to search a newly written program, in case that a new program is written on a program already written on the tape.

14 Claims, 9 Drawing Sheets

FIG.5 data region dummy region sub-code region

METHOD FOR WRITING AND SEARCHING ON A TAPE FOR A DIGITAL SIGNAL WRITING AND REPRODUCING DEVICE

BACKGROUND OF THE INVENTION

1. Field of the Invention

The present invention relates to a digital video cassette recorder (DVCR) and more particularly, to a method of writing and searching index data for a DVCR.

2. Discussion of the Related Art

For an index search, a video cassette recorder (VCR) displays various programs written on a tape to permit a user to select a desired program and reproduce the program selected by moving the tape to the selected program.

VCR generally modulates a pulse width of a control signal in response to an index signal which is indicative of a start position each of program written on a magnetic tape, and searches for the programs using the modulated control signal and the index signal.

To display a program selected by the user, the index search is performed and a reproducing mode is then performed.

Generally, a video index search system (VISS) and a video address search system (VASS) are used for index search. The VISS performs the index search using only an index signal. The VASS performs the index search using an address signal which is indicative of an absolute address of a tape in addition to the index signal.

An apparatus for writing and searching index data for a DVCR according to the background art will be described with reference to the accompanying drawings.

Figure 1:
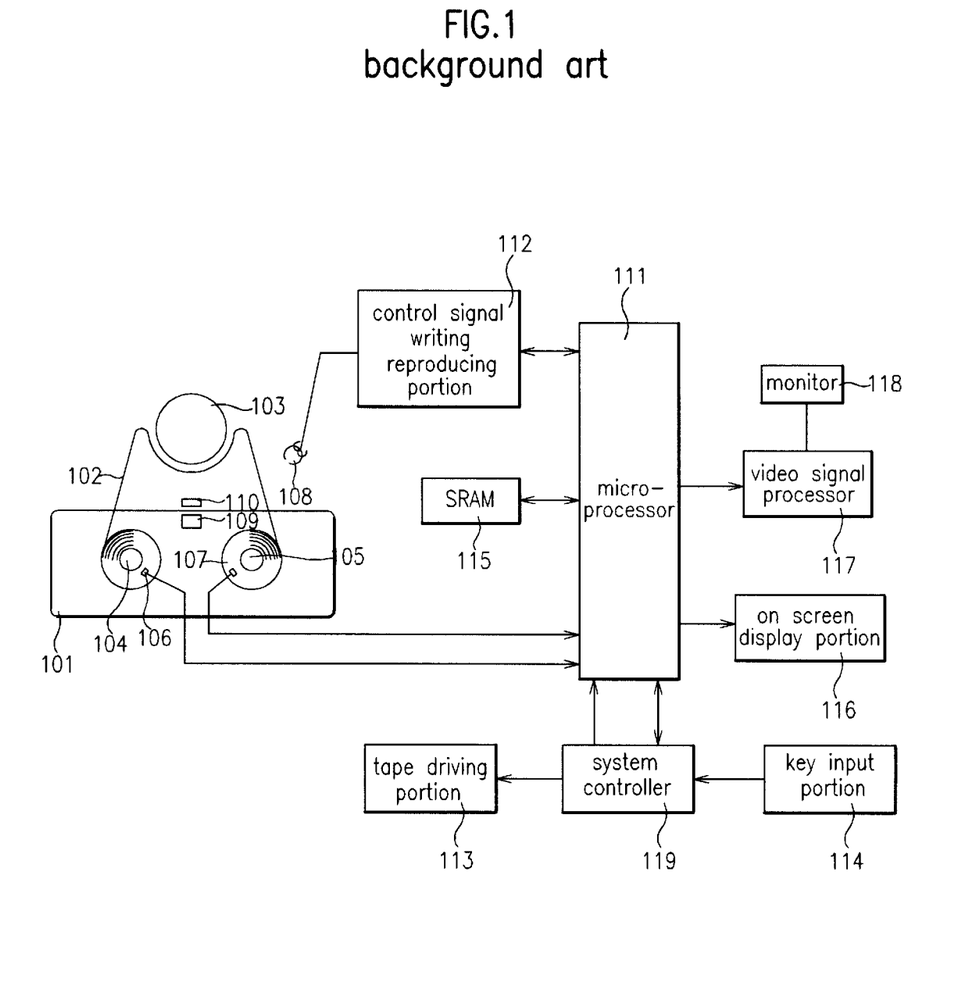
FIG. 1 is a block diagram illustrating an apparatus for writing and searching index data for a DVCR to the background art.

FIG. 1 is a schematic block diagram illustrating an apparatus for writing and searching index data for a DVCR according to a background art.

Index data is not stored in a certain position of a tape but stored in a cassette memory to which a nonvolatile memory is attached.

In other words, the apparatus for writing and searching index data for a DVCR according to the background art includes a cassette memory (nonvolatile memory) 109 mounted in a certain position of a cassette 101, for writing index data, rotation speed detectors 106 and 107 respectively mounted in a supply reel 104 and a winding reel 105 of the cassette 101, for detecting a rotation speed, a control signal writing/reproducing portion 112 for reproducing and writing a control signal of a cassette tape 102 through a control head 108, an SRAM 115 for temporarily storing the index data in a program writing mode to forward the index data to the cassette memory 109 when ejecting a tape, and a microprocessor 111 for controlling writing/reproduction of the index data in response to an external key signal.

Reference numerals 113 and 114 represent a tape driving portion and a key input portion, respectively. Reference numerals 119, 118 and 117 represent a system controller, a monitor, and a video signal processor, respectively. Reference numeral 116 represents an on screen display (OSD) portion. Also reference numeral 103 represents a rotation drum.

The operation of the apparatus for writing and searching index data for a DVCR according to the background art will be described below.

The microprocessor 111 writes the index data in the SRAM 115 and forwards the same to the cassette memory 109 when ejecting the cassette.

To reproduce the index data in the cassette memory 109, the microprocessor 111 reads the index data stored in the cassette memory 109 and stores the same in the SRAM 15. At the same time, the microprocessor 111 displays the index data in a screen to be recognized by the user. Then, if the user selects a desired program, the microprocessor 111 searches the position of the program selected by the user by checking the remaining amount of the tape in response to a signal input through the rotation speed detectors 106 and 107.

Figure 2:
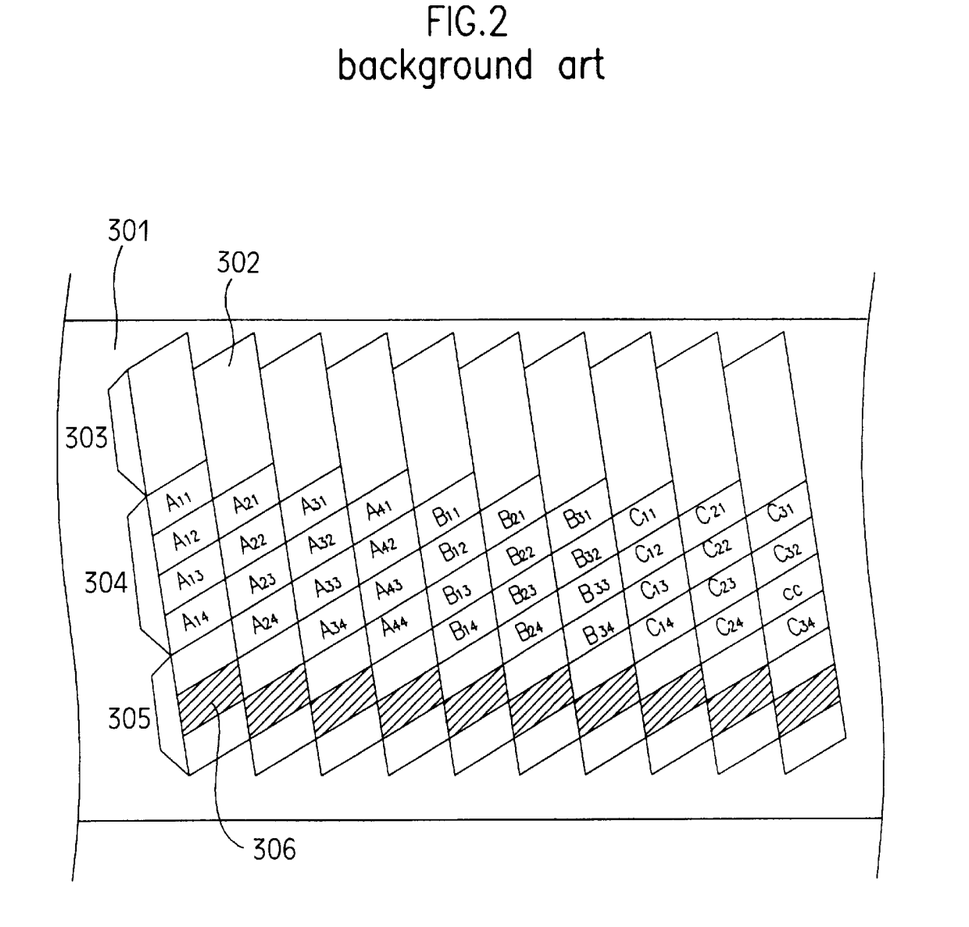
FIG. 2 shows the operation of a method of writing and searching index data for a DVCR according to the background art.

FIG. 2 shows a method of writing and searching index data for a DVCR according to the background art. An additional data region 304 is formed on a tape to write index data. For writing the index data, data in a data signal region 303 is maintained as is, while the index data is written in the additional data region 304.

Reference numerals 301, 302, 305 and 306 represent a magnetic tape, a track, a header region, and a positioning signal, respectively.

The method of writing and searching index data for a DVCR according to the background art has several problems.

The index data is stored in the memory attached to the cassette and read in a reproducing mode. The cassette memory is used for index search. Therefore, it is not economical and some error may occur when checking the remaining amount of the tape and performing the index search. In addition, if the index data is not exactly written in the additional data region on the tape, there is a problem that the index data may be overwritten on video data.

SUMMARY OF THE INVENTION

Accordingly, the present invention is directed to a method of writing and searching index data for a DVCR that substantially obviates one or more of the problems due to limitations and disadvantages of the related art.

An object of the present invention is to provide a method of writing and searching index data for a DVCR, which facilitates search of a program newly written on a tape.

Another object of the present invention is to provide a method of writing and searching index data for a DVCR, facilitates which search of a program newly written on a tape having an already written program.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of writing index data for a DVCR according to the present invention is characterized in that index data is written on a tape after a program start mark is written when starting a program recording and a program end mark is written when finishing the program recording.

In another aspect, a method of writing index data for a DVCR according to the present invention includes the steps of determining whether or not there is a program start mark of a program erased in the course of performing a program recording, writing a program end mark and index data if there is the program start mark, and writing the program start mark if there is no program start mark.

In other aspect, a method of searching index data for a DVCR according to the present invention includes the steps of searching and reproducing a desired program from index data displayed on a screen, writing a new index data after moving a tape to a program end mark of a current program if an ejection key is inputted, and ejecting the tape.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention, In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
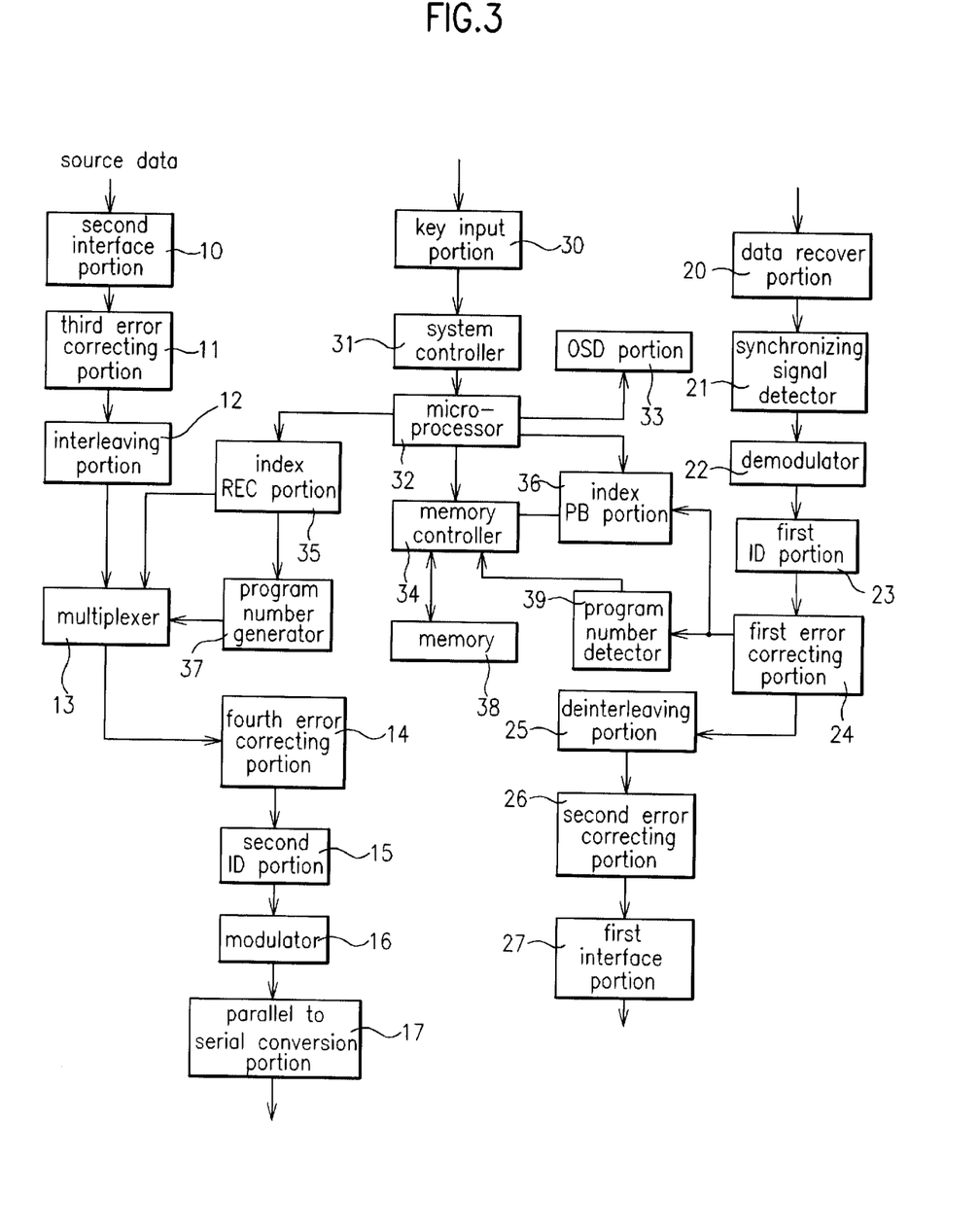
FIG. 3 is a block diagram illustrating an apparatus for writing and searching index data for a DVCR according to the present invention.

As shown in FIG. 3, an apparatus for writing and searching index data for a DVCR according to the present invention includes a data recovery portion 20 for recovering data and clock from a tape in a reproducing mode, a synchronizing signal detector 21 for detecting a block synchronizing signal from an output signal of the data recovery portion 20 and aligning data, a demodulator 22 for demodulating output data of the synchronizing signal detector 21, a first ID portion 23 for indicating the original position of the demodulated data, a first error correcting portion 24 for correcting random error using the position information from the first ID portion 23 in the reproducing mode, a deinterleaving portion 25 for exchanging a memory reading direction and a memory writing direction with each other to write the output of the first error correcting portion during normal reproduction, a second error correcting portion 26 for correcting burst error by exchanging the memory reading direction and the memory writing direction with each other by the deinterleaving portion 25, a first interface portion 27 for interfacing error corrected signals from the second error correcting portion 26 to match externally output data and control signal, a second interface portion 10 for interfacing the externally output data and control signal in a recording mode, a third error correcting portion 11 for adding parity for prevention of burst error to an output signal of the second interface portion 10 in the reproducing mode, an interleaving portion 12 for outputting an output signal from the third error correcting portion 11 by exchanging the memory reading direction and the memory writing direction with each other in the reproducing mode, a key input portion 30, such as a panel key or a remote controller, for outputting a system control signal in response to selection by a user, a system controller 31 for controlling the system by an output signal of the key input portion 30, a microprocessor 32 for outputting a control signal to write or reproduce index data in response to an output signal of the system controller 31, a memory 38 for storing and outputting the index data, a memory controller 34 for selectively controlling the memory 38 under the control of the microprocessor 32 during editing and reproduction, an index PB portion 36 for reproducing an index signal by of an index reproducing signal of the microprocessor 32, a program number detector 39 for detecting a current program number by the output of the first error correcting portion 24, an index REC portion 35 for outputting the index signal under the control of the index writing signal of the microprocessor 32 and the memory controller 34, a program number generator 37 for generating a program number whenever the program is written by the output signal of the index REC portion 35, a multiplexer 13 for selectively outputting a video signal output from the interleaving portion 12, an index signal output from the index writing portion 35, and a program number output from the program number generator 37, a fourth error correcting portion 14 for adding parity to an output signal of the multiplexer 13 to prevent random error of the output signal of the multiplexer 13, a second ID portion 15 for outputting a code value for the data position, where the output of the fourth error correcting portion 14 is to be written, and a code value for the position of actual data and the control signal, a modulator 16 for modulating the output data of the second ID portion 15 in response to a DVCR system, and a parallel to serial conversion portion 17 for converting a parallel data of the modulator 16 to a serial data.

The second interface portion 10 changes the external control signal to be suitable for the condition of the DVCR when writing data on the tape. The first interface portion 27 counters the operation of the second interface portion 10.

In order to process burst error, the third error correcting portion 11 adds parity to the data input through the first interface portion 10 in a recording mode and the second error correcting portion 26 adds parity to the data input through the second interface portion 26 in the reproducing mode.

The interleaving portion 12 reads the memory in a writing mode to process the burst error of the parity added signal and the deinterleaving portion 25 reads the memory in a reproducing mode to process the burst error of the parity added signal.

After processing the burst error, parity is added to the burst error processed signal to process random error by the fourth error correcting portion 14 in a writing mode and to process random error by the first error correcting portion 24 in a reproducing mode.

The second ID portion 15 receives the output of the fourth error correcting portion 14 and forwards a code value for indicating the position of data to be written and a code value for the position of actual data and the other control signal, to the modulator 16.

Further, the first ID portion 23 indicates the original position of the data demodulated by the demodulator 22 in a reproduction mode. The deinterleaving portion 25 writes the data using the original position of the data to exactly correct error of the ID code value occurred in the first ID portion 23.

The modulator 16 modulates the data to coincide with the condition of the DVCR during writing. The parallel to serial conversion portion 17 converts the data into a serial data so as to write the data in the tape.

The data recovery portion 20 recovers data and clock from a signal generated during reproduction after inserting a tape. The synchronizing signal detector 21 realigns a block synchronizing signal and data and then inputs the same to the demodulator 22. The demodulator 22 demodulates the data. The data is finally output through the first ID portion 23, the first error correcting portion 24, the deinterleaving portion 25, the second error correcting portion 26, and the first interface portion 27 so that normal reproduction is performed.

Furthermore, if the index writing signal selected by a user is input through the key input portion 30, such as a panel key or a remote controller, the system controller 31 forwards the index writing signal to the microprocessor 32.

Then, the index REC portion 35 is requested to write the index data edited by the user on the tape. At this time, the multiplexer 13 appropriately selects the video signal input from the interleaving portion 12 and the index signal input from the index REC portion 35.

In recording the program, the program number generator 37 forwards the program number to the multiplexer 13 to write the program number in turn whenever the user writes its desired program.

In addition, in reproducing the index data, the index PB portion 36 and the program number detector 39 receive the output signal from the first error correcting portion 24. The index PB portion 36 outputs the index data and the program number detector 39 detects the program number.

The index data detected by the program number detector 39 is displayed on the OSD portion 33 under the control of the microprocessor 32.

The memory controller 34 shares the memory portion 38 in a recording mode and selectively controls the index data during editing and reproducing.

A method of writing and searching index data for a DVCR of the present invention will be described in detail with reference to the accompanying drawings.

Figure 4:
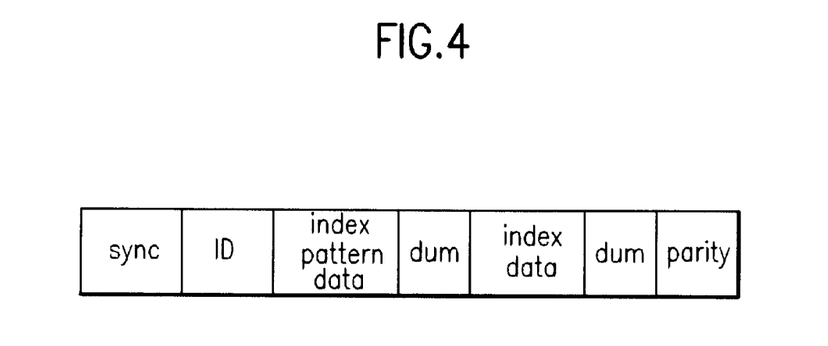
FIG. 4 shows a format of index data according to the present invention.
Figure 5:
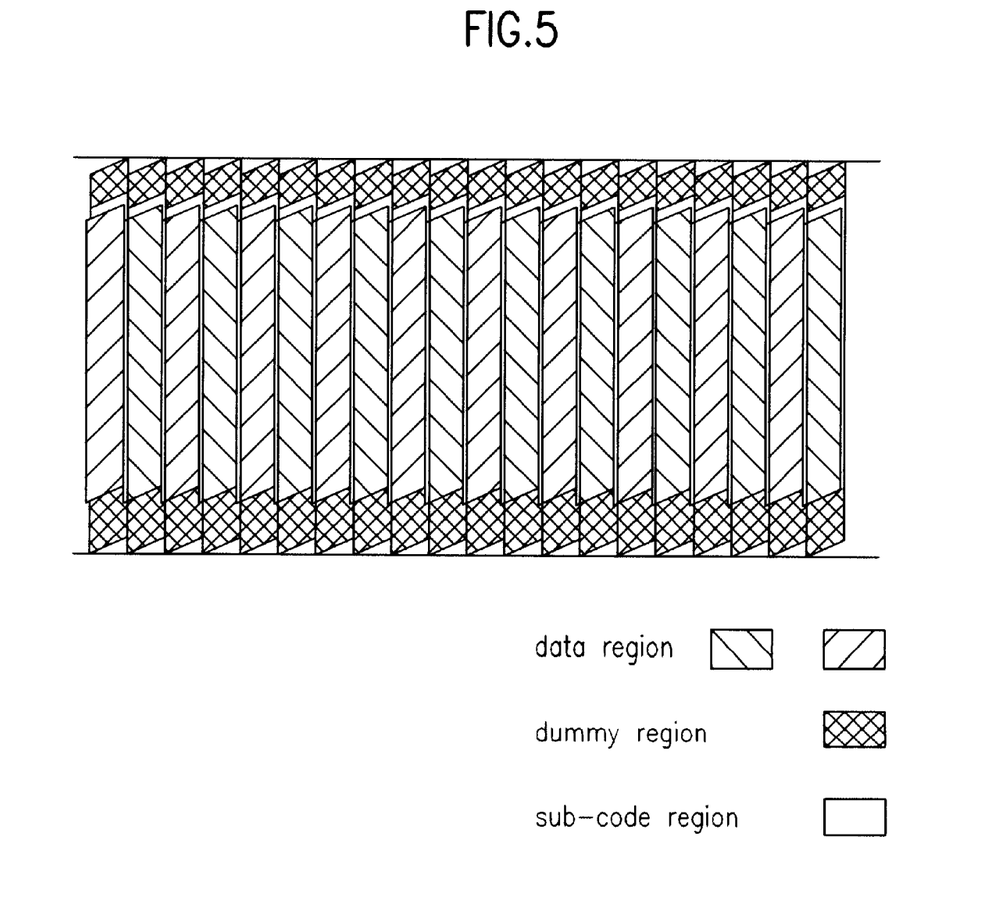
FIG. 5 shows data written in a tape according to the present invention.

FIG. 4 shows index data format according to the present invention. FIG. 5 shows data written in a tape according to the present invention.

As shown in FIG. 4, a synchronizing region of the index data format includes synchronizing signal values for detecting a synchronizing signal in block unit. An ID region represents the position of the data on the tape. An index pattern data (IDXPD) region corresponds to a previous level for searching actual index data and indicates there are index data coming in next to the IDXPD region. In other words, when writing the index data, data patterns which are most likely to generate error are written in the IDXPD region. It is possible to search the index data if only the IDXPD is recovered to its original state in the reproduction mode. This is intended to detect complete index data when detecting the index data written on the tape.

A dummy (DUM) region is disposed at both sides of the index data and writes a single data value to protect the index data. The index data region writes actual data such as a program title edited by the user.

A parity region shares error correction code when writing and reproducing the index data.

In case that the index data are written in the tape, a type of the tape is shown in FIG. 5. The program number on the tape is written in a sub code region.

Figure 6:
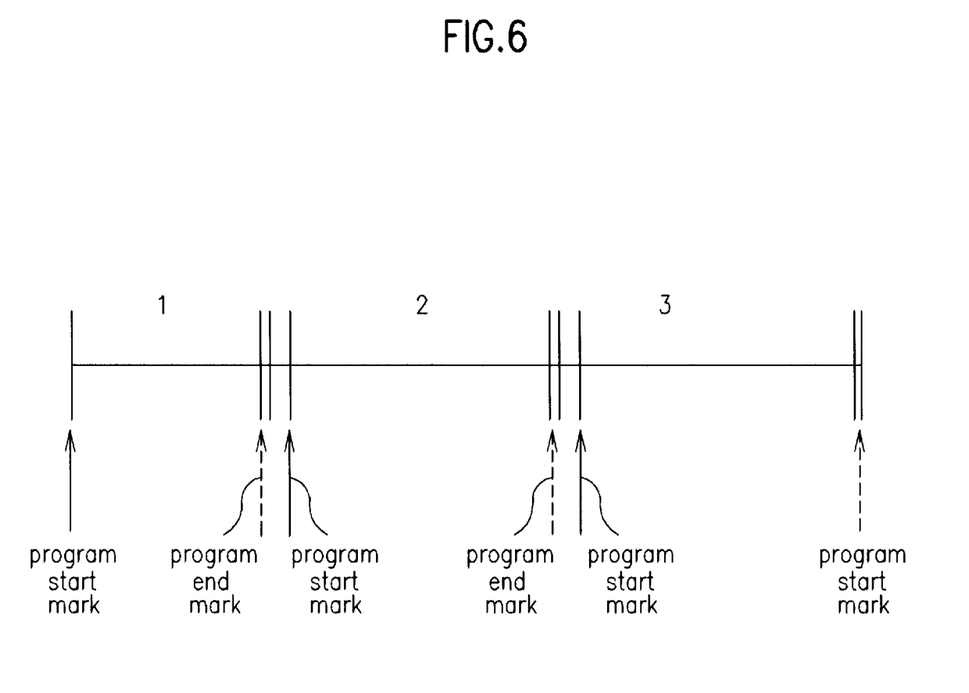
FIG. 6 shows the state of programs sequentially recorded in a tape according to the present invention.

In case that new programs are sequentially written on the tape, a type of the tape is shown in FIG. 6.

As shown in FIG. 6, if a program recording command is received, a program start mark is written in the position where the program is started.

Thereafter, the program is recorded and the program end mark is then written. The index data is finally written.

If an ejection key is inputted by the user, rewinding (REW) operation is performed towards the program end mark and the tape is ejected.

The program start mark or the program end mark is written using VISS, VASS and specific data.

Figure 7A:
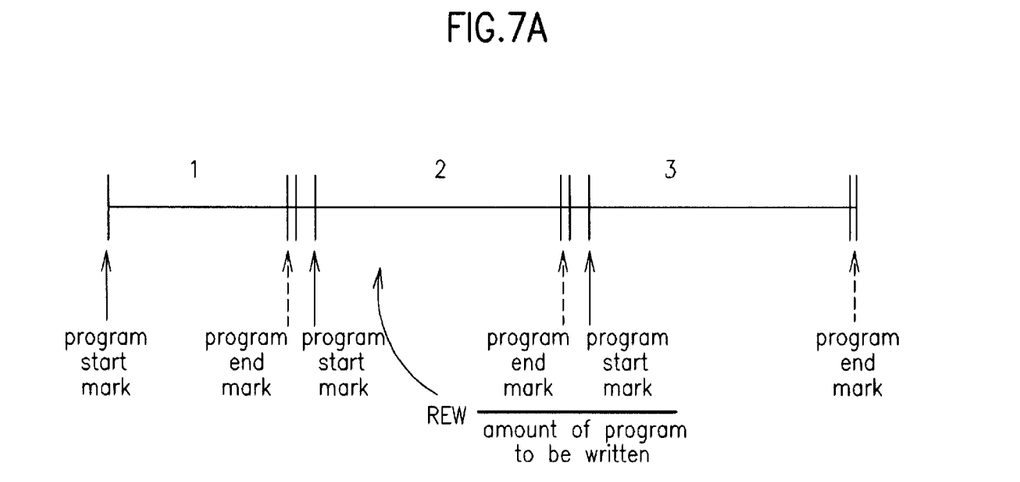
FIGS. 7A to 7C shows the state of programs overwritten on already recorded programs in a tape according to the present invention.
Figure 7B:
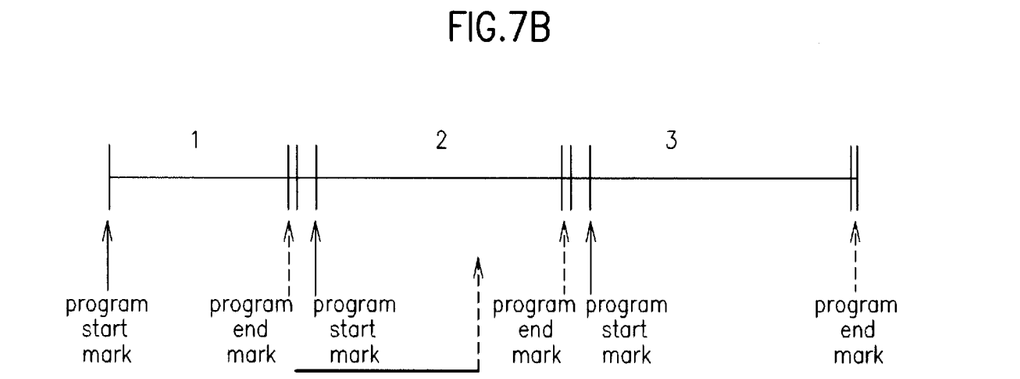
Figure 7C:
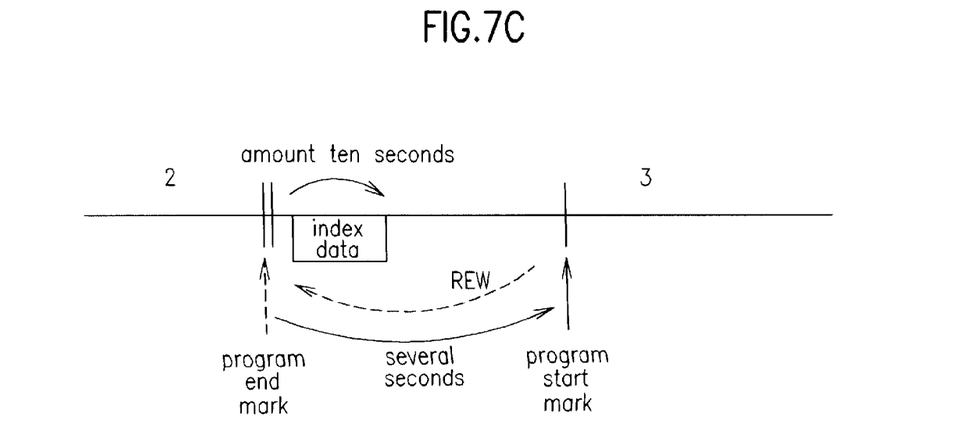
Figure 8A:
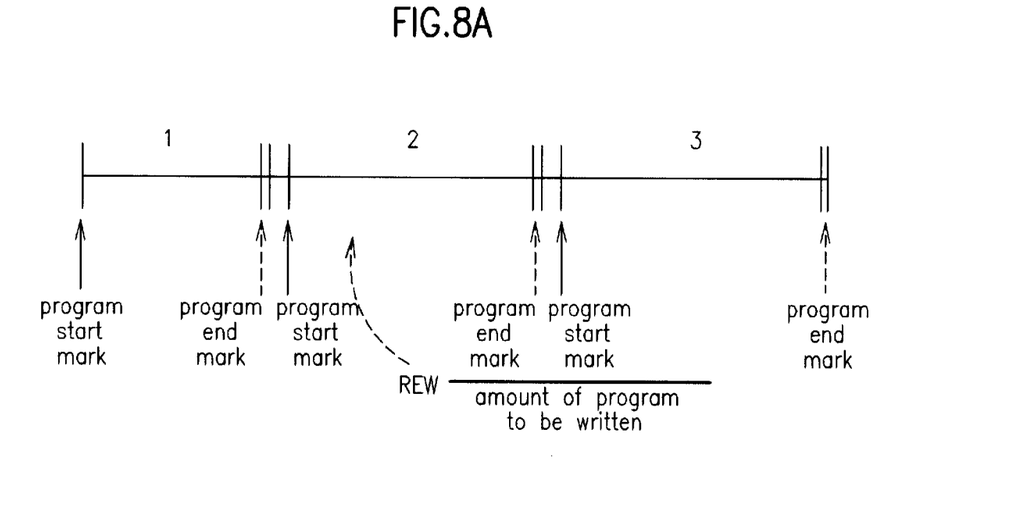
FIGS. 8A to 8C shows the state of another programs overwritten on already recorded programs in a tape according to the present invention.
Figure 8B:
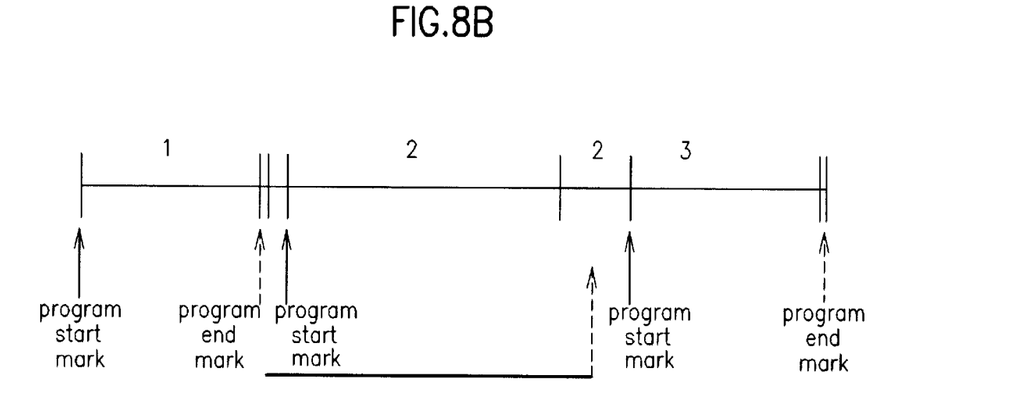
Figure 8C:
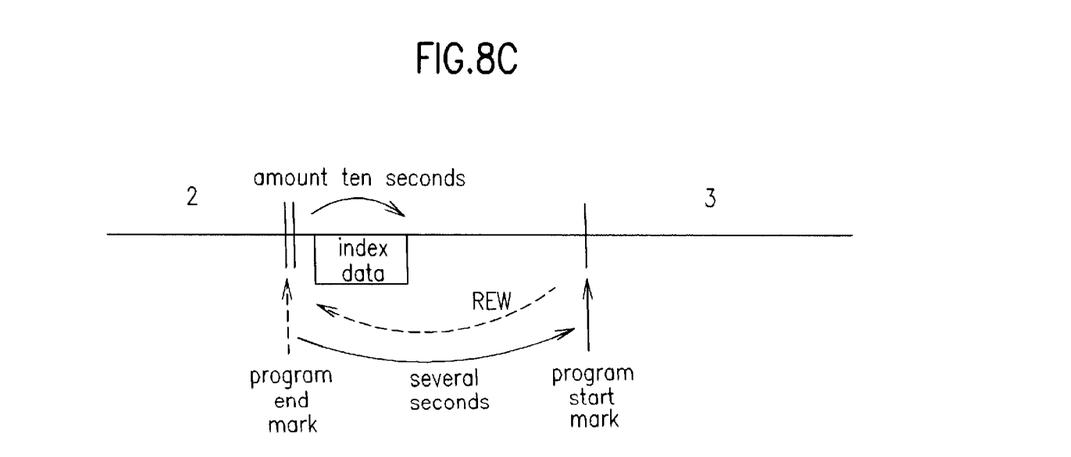

FIGS. 7A to 7C show the state of a new program overwritten on the tape in which the programs are sequentially recorded, according to the first embodiment of the present invention. FIGS. 8A to 8C show the state of a new program overwritten on the tape in which the programs are sequentially recorded, according to the second embodiment of the present invention.

As shown in FIG. 7A, if it is intended to write a new program less than an amount of the program number 2 in the course of viewing the program number 2, the preceding level of the program number 2, that is, the position of the program start mark of the program number 2 is searched to record the new program. Thus, it is possible to record the new program without erasing the program start mark of the program number 3.

After recording the new program, the program end mark is written. The index data corrected as shown in FIG. 7C is written and the program end mark of the program number 2 is searched to perform REW operation.

In case that the index data is edited after recording a new program, the new program is recorded, in the next level of the current program number 2 when ejecting the tape.

Furthermore, as shown in FIG. 8A, if it is intended to record a program greater than an amount of the program number 2 in the course of viewing the program number 2, fast forward (FF) operation is performed as shown in FIG. 7B to write data while recording a new program. Since an amount of data to be written is greater than the amount of the current program number 2, the data is written in the program number 3 as shown in FIG. 8B, thereby erasing the program start mark of the program number 3.

Therefore, after the program end mark of the current program 2, the index data is written as shown in FIG. 8C. The program start mark of the program number 3 is written by FF operation for several seconds and REW operation is then performed to search the program end mark of the program number 2.

Figure 9:
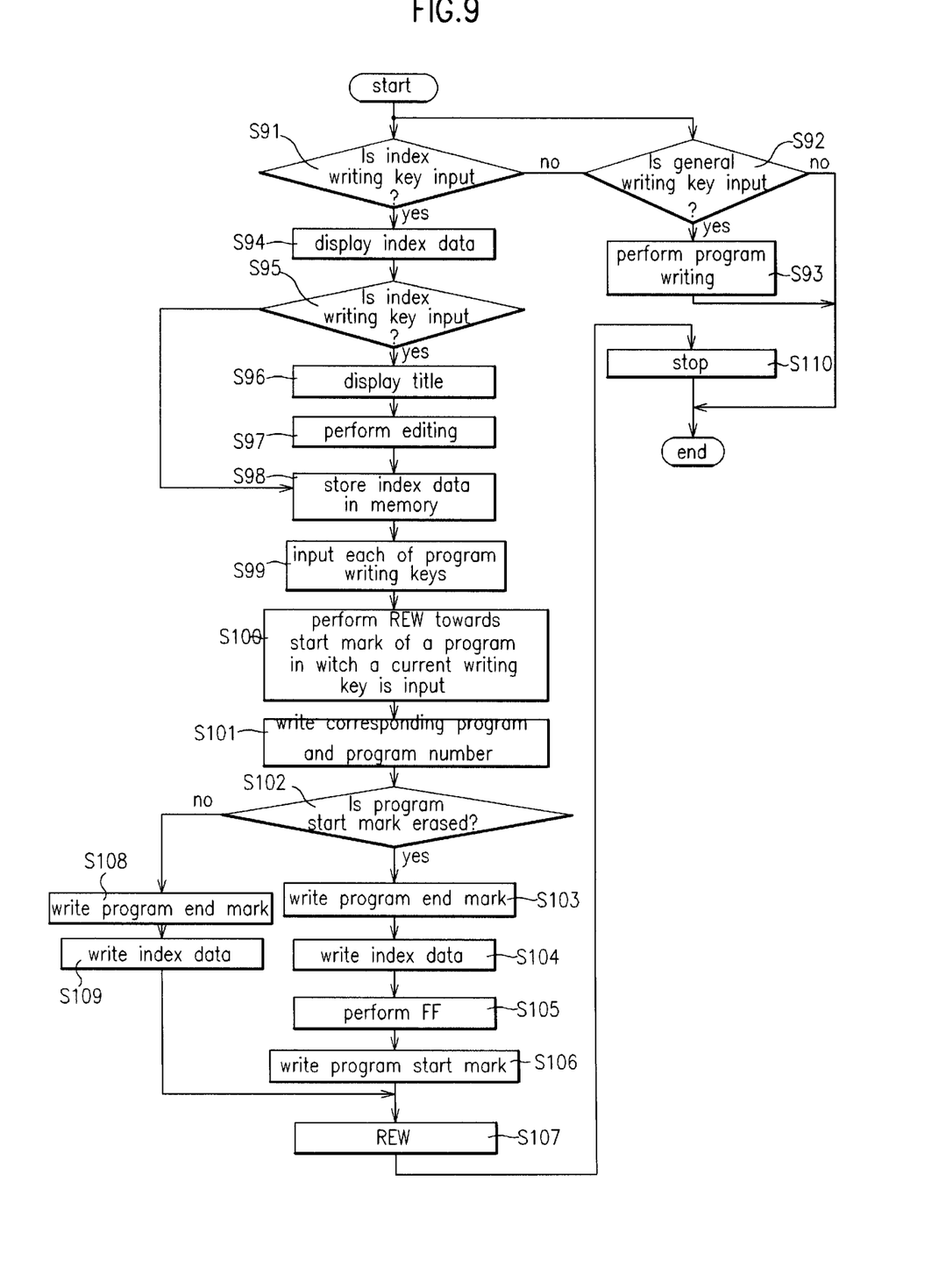
FIG. 9 is a flow chart illustrating a method of writing index data for a DVCR according to the present invention.

The method of writing index data will be described in detail with reference to a flow chart of FIG. 9.

It is determined whether or not the index writing key selected by the user is input in step S91. If the index writing key is not input, it is determined whether or not a general writing key is input in step S92. If the general writing key is input, video data instead of the index data is written in step S93.

Meanwhile, if the index writing key selected by the user is input, the index data is displayed on the screen in step S94 so that it is determined whether or not a key to be edited is input in step S95.

If the key to be edited is input, a title of the current program written in the tape is displayed on the screen in step S96 and edited in step S97, and then temporarily stored in the memory 38 in step S98.

If the key to be edited is not input in step S95, the existing index data is stored in the memory 38 in step S98.

Thereafter, to record a desired program, the writing key is input. At this time, since it is likely that the program start portion is disposed between the preceding program and the next program, REW operation is performed towards the program start mark to which the program writing key of the current program is input, in steps S99 and S100.

In case that the amount of the reproduced program is greater than that of the current program to be reproduced at the position where the program writing key is input, FF operation is performed towards the program end mark by selection of the user instead of performing REW operation towards the program start mark, so that a new program can be written on the next program.

The program recording is started from the position of the program start mark and program numbers thereof are written in the sub code region in step S101.

In step S102, it is determined whether or not the program start mark is erased in the course of recording the program.

The index data includes title information, the amount of each of the recorded programs, and recorded date.

A timer is reset in the program start mark of each of the programs to count the amount of a new program to be recorded and the amount of the preceding program recorded in the index data.

In other words, if the amount of the preceding program is greater than the amount of a new program to be recorded, it is regarded that the program start mark is erased.

As a result of step S102, if the program start mark is erased, the program end mark is written at the end of the newly recorded program in step S103 and the index data is written in step S104.

After writing the index data, FF operation of the tape is performed for several seconds in step S105 to write the program start mark of the next program in step S106 and then REW operation is performed towards the program end mark of the current program in step S107.

Further, as a result of step S102, if the erased program start mark is two or more, that is, the amount of the new program is greater than that of the preceding program, the program number coming in next to the newly recorded program is obtained by adding the number 1 to the number of the program start mark of the erased program.

Meanwhile, if the program start mark is not erased in step S102, the program end mark is written in step S108 and the index data is written for several seconds in step S109. REW operation is performed towards the program end mark of the current program in step S107 to reproduce the index data when reproducing the tape and the program recording is then stopped in step S110.

Furthermore, the last program displayed on the screen is selected during index reproduction to search the program start mark of the last program so that the writing mode of the new program is performed. Thus, the new program is recorded after the last program instead of overwriting on the preceding program.

Figure 10:
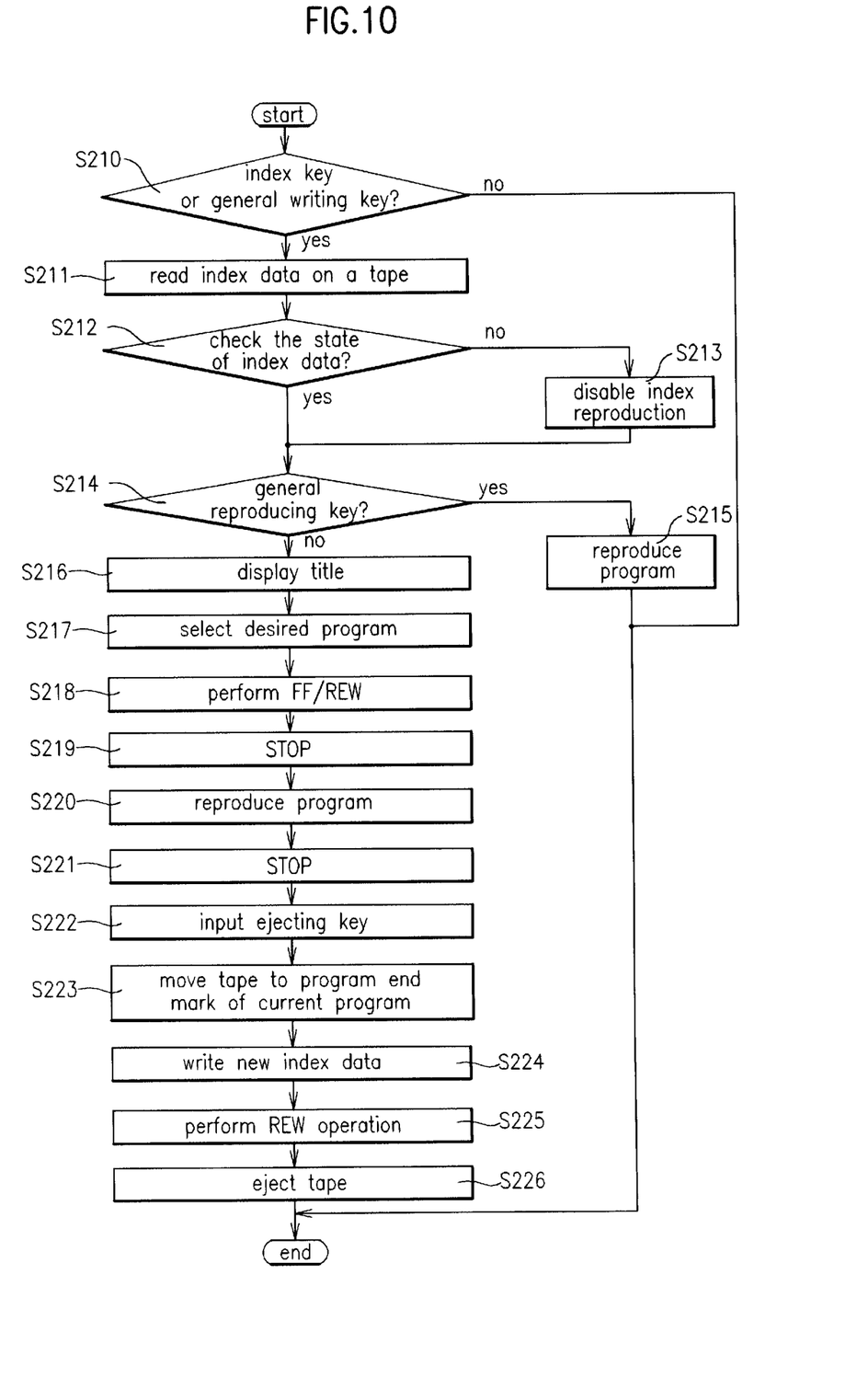
FIG. 10 is a flow chart illustrating a method of searching index data for a DVCR according to the present invention.

The method of searching the written index data will be described with reference to a flow chart of FIG. 10.

It is determined whether the index key or the general reproducing key is input by the user in step S210. If the index key or the general key is input, the index data on the tape is read in step S211.

The state of the read index data is checked in step S212. If the index data is not searched or any error occurs, a message indicating of impossibility of index reproduction is displayed on the screen for the user in step S213.

Meanwhile, if the index data is searched upon checking the index data, it is determined whether or not the general reproduction key is input in step S214. If the general reproduction key is input, the program is just reproduced in step S215.

Upon determination in step S214, if the general reproducing key is not input, it is regarded that the index reproducing key 15 is input. If the general reproducing key instead of the index reproducing key is input in step S211, normal reproduction is performed in step S212.

Meanwhile, if the index reproducing key is input, the index data written in the tape is searched and it is determined whether or not the index data is checked in step S214 so as to perform the index reproduction.

Upon checking the index data, if the index data is not searched, the message indicative of impossibility of the index reproduction is displayed on the screen in step S216. If the index data is searched, the program title written is displayed on the screen to have the user to select its desired program in step S217.

If the user selects its desired program, REW/FF operation is performed to search the desired program and the desired program is then reproduced in steps S218 and S219.

If the reproduction of the program is completed, the reproduction of the program is stopped in step S221. If the user selects the ejection key in step S222, the tape is moved to the program end mark of the current program in step S223 and final index data is written in step S224.

After writing the index data, REW operation is performed to easily reproduce the index data in step S225 and the tape is then ejected in step S226.

The method of writing and searching index data for a DVCR according to the present invention has the following advantages.

It is possible to apply the tape which is currently distributed in the market to the present invention. In case that a new program is recorded over a program already recorded on the tape, it is easy to search the newly recorded program.

It will be apparent to those skilled in the art that various modifications and variations can be made in the method of writing and searching index data for a DVCR according to the present invention without departing from the spirit or scope of the invention. Thus, it is intended that the present invention covers the modifications and variations of the invention provided they come within the scope of the appended claims and their equivalents.

What is claimed is:

1. A method of writing index data for a DVCR comprising the steps of:

writing a program start mark if a program recording command is input;

writing a program number and recording a program;

writing a program end mark if a program recording end command is input while recording the program; and writing index data and ejecting a tape after rewinding the tape towards the program end mark if an ejection key is input.

2. The method as claimed in claim 1, wherein in the step of writing the program start mark, a new program is recorded after searching a program end mark of the last program if the program recording command is input.

3. A method of writing index data for a DVCR comprising the steps of:

writing a program number and recording a program at a position of a program start mark of a current program if a program recording command is input in the course of viewing a program;

determining whether or not there is a program start mark of a program overwritten in the course of recording the program;

writing a program end mark and index data if there is the program start mark of the overwritten program; and writing a program start mark of a next program.

4. The method as claimed in claim 3, further comprising the step of recording a new program after searching a program end mark of the last program during index reproduction if the program recording command is input.

5. The method as claimed in claim 4, wherein the index data is written and the program recording is then stopped if the new program recording is performed.

6. The method as claimed in claim 3, wherein the program end mark and the index data are written if there is no program start mark when determining whether or not there is the program start mark.

7. The method as claimed in claim 3, further comprising the step of ejecting a tape after rewinding the tape towards the program end mark if an ejection key is input.

8. The method as claimed in claim 3, wherein the index data includes data for writing amounts of each of the programs.

9. The method as claimed in claim 3, wherein counting operation for the amounts of the program is reset in the program start mark.

10. The method as claimed in claim 3, further comprising the step of determining whether or not an amount of a new program is greater than that of the current program when determining whether or not there is the program start mark of the overwritten program.

11. The method as claimed in claim 3, further comprising the step of recording a new program after fast forwarding a tape towards the program end mark in response to a user's selection if a reproduced amount of a program in the course of viewing is greater than an amount of a program to be reproduced, when writing the program number and recording the program.

12. The method as claimed in claim 3, wherein the program number coming in next to a newly recorded program uses a program number of the number of the program start mark of the overwritten program plus 1 if the number of the program start mark of the overwritten program is two or more.

13. The method as claimed in claim 3, further comprising the step of recording a new program after searching a program end mark of the last program if the program recording command is input.

14. A method of searching index data for a DVCR comprising the steps of:

displaying index data if an index reproduction key is input;

searching and reproducing a program selected by a user among the display index data; and ejecting a tape after writing a new index data by moving the tape to a program end mark of a current program if an ejection key is input.

* * * * *